(12) United States Patent
Wand et al.

(10) Patent No.: US 10,128,546 B2
(45) Date of Patent: Nov. 13, 2018

(54) BATTERY COMMUNICATION SYSTEM FOR BATTERY PACKS

(71) Applicant: FORD GLOBAL TECHNOLOGIES, LLC, Dearborn, MI (US)

(72) Inventors: Thomas Joseph Wand, Canton, MI (US); Benjamin A. Tabatowski-Bush, South Lyon, MI (US); Richard Mo, Dearborn, MI (US); Graham L. Briggs, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 101 days.

(21) Appl. No.: 15/175,551

(22) Filed: Jun. 7, 2016

(65) Prior Publication Data
US 2017/0352925 A1 Dec. 7, 2017

(51) Int. Cl.
| | | |
|---|---|---|
| *H01M 10/42* | (2006.01) | |
| *G06F 13/40* | (2006.01) | |
| *H01M 10/48* | (2006.01) | |
| *H02J 7/00* | (2006.01) | |

(52) U.S. Cl.
CPC .... *H01M 10/4257* (2013.01); *G06F 13/4068* (2013.01); *H01M 10/482* (2013.01); *H02J 7/0021* (2013.01); *H01M 2010/4271* (2013.01); *H01M 2010/4278* (2013.01); *H01M 2220/20* (2013.01)

(58) Field of Classification Search
None
See application file for complete search history.

(56) References Cited

U.S. PATENT DOCUMENTS

| | | | | | |
|---|---|---|---|---|---|
| 5,563,496 | A | * | 10/1996 | McClure | H02J 7/0081 320/128 |
| 5,914,656 | A | * | 6/1999 | Ojala | G01D 4/004 340/521 |
| 5,965,997 | A | * | 10/1999 | Alwardi | G01R 31/3606 320/132 |
| 6,456,948 | B1 | * | 9/2002 | Lim | H01M 10/4257 320/134 |

(Continued)

FOREIGN PATENT DOCUMENTS

| | | | | | |
|---|---|---|---|---|---|
| DE | 102015102226 | * | 8/2015 | | G07C 5/0841 |
| EP | 1806592 | A1 * | 7/2007 | | G01R 31/3658 |

(Continued)

OTHER PUBLICATIONS

'TPS382x Voltage Monitor With Watchdog Timer' datasheet, Texas Instruments, Apr. 1998—Revised Nov. 2015.*

(Continued)

*Primary Examiner* — Steven G Snyder
(74) *Attorney, Agent, or Firm* — Carlson, Gaskey & Olds

(57) ABSTRACT

A battery pack according to an exemplary aspect of the present disclosure includes, among other things, a battery monitoring integrated circuit (BMIC) associated with a grouping of battery cells, a calibration microcontroller configured to store battery data associated with the grouping of battery cells, a main microcontroller; and a data transmission node establishing a shared path for communicating both a status signal from the BMIC and the battery data from the calibration microcontroller.

25 Claims, 3 Drawing Sheets

(56) References Cited

U.S. PATENT DOCUMENTS

| | | | |
|---|---|---|---|
| 6,697,897 B1* | 2/2004 | Friel | H04L 5/1423 709/209 |
| 7,041,400 B2* | 5/2006 | Kim | H01M 10/4257 429/61 |
| 7,638,979 B2* | 12/2009 | Vandensande | G01R 31/3658 320/118 |
| 7,697,957 B2* | 4/2010 | Pattenden | G06F 1/26 320/106 |
| 7,723,955 B2* | 5/2010 | Zaag | H02J 7/0019 320/109 |
| 8,237,405 B2 | 8/2012 | Li | |
| 8,280,439 B2* | 10/2012 | Pattenden | G06F 1/26 320/106 |
| 8,543,162 B2* | 9/2013 | Pattenden | G06F 1/26 320/106 |
| 8,970,178 B2* | 3/2015 | Berkowitz | B60L 11/1861 320/129 |
| 9,140,759 B2 | 9/2015 | Bolduc | |
| 9,142,994 B2* | 9/2015 | Berkowitz | H02J 7/0073 |
| 9,341,678 B2* | 5/2016 | Kim | G01R 31/3606 |
| 9,428,073 B2* | 8/2016 | Baughman | G07C 5/0841 |
| 9,465,077 B2* | 10/2016 | Love | G01R 31/3606 |
| 9,702,940 B2* | 7/2017 | Maluf | G01R 31/3606 |
| 9,726,554 B1* | 8/2017 | Ghantous | G01K 13/00 |
| 9,766,298 B2* | 9/2017 | Lennevi | G01R 31/3679 |
| 9,787,122 B2* | 10/2017 | Berkowitz | H02J 7/007 |
| 9,791,513 B2* | 10/2017 | Maluf | G01R 31/362 |
| 2005/0162129 A1* | 7/2005 | Mutabdzija | H01M 10/48 320/116 |
| 2007/0123304 A1* | 5/2007 | Pattenden | G06F 1/26 455/557 |
| 2008/0180106 A1 | 7/2008 | Gorbold | |
| 2010/0002821 A1* | 1/2010 | Hammerschmidt | H04L 7/10 375/360 |
| 2010/0197366 A1* | 8/2010 | Pattenden | G06F 1/26 455/572 |
| 2010/0289521 A1* | 11/2010 | Nakata | H04L 25/0278 326/30 |
| 2011/0316548 A1* | 12/2011 | Ghantous | G01R 31/3637 324/427 |
| 2012/0009445 A1* | 1/2012 | Li | H01M 10/482 429/50 |
| 2012/0047408 A1* | 2/2012 | Wilborn | H03M 13/6525 714/718 |
| 2012/0200266 A1* | 8/2012 | Berkowitz | B60L 11/1861 320/139 |
| 2012/0322513 A1* | 12/2012 | Pattenden | G06F 1/26 455/572 |
| 2013/0113495 A1* | 5/2013 | Kim | G01R 31/3606 324/434 |
| 2013/0235902 A1* | 9/2013 | Patel | A61K 31/56 374/152 |
| 2014/0053047 A1* | 2/2014 | Li | H03M 13/23 714/786 |
| 2014/0084846 A1* | 3/2014 | Berkowitz | H02J 7/0073 320/107 |
| 2014/0197682 A1 | 7/2014 | Tabatowski-Bush et al. | |
| 2015/0057728 A1* | 2/2015 | Ayal | A61N 1/0551 607/116 |
| 2015/0153417 A1* | 6/2015 | Maluf | B60L 11/1861 324/426 |
| 2015/0231985 A1 | 8/2015 | Li | |
| 2015/0357841 A1* | 12/2015 | Berkowitz | H02J 7/0073 320/139 |
| 2015/0377976 A1* | 12/2015 | Maluf | G01R 31/3679 702/63 |
| 2016/0023566 A1 | 1/2016 | Lee | |
| 2016/0202322 A1* | 7/2016 | Schaedlich | H04Q 9/00 324/426 |
| 2016/0223412 A9* | 8/2016 | Patel | A61K 31/56 |
| 2017/0075345 A1* | 3/2017 | Fisher | G05B 19/41855 |
| 2017/0078455 A1* | 3/2017 | Fisher | H04L 69/03 |

FOREIGN PATENT DOCUMENTS

| | | | | |
|---|---|---|---|---|
| EP | 3085568 A1 | * | 10/2016 | B60L 11/1864 |
| JP | 2012048857 A | * | 3/2012 | |
| KR | 20100012595 A | * | 2/2010 | |
| WO | WO 9001221 A1 | * | 2/1990 | G01R 31/362 |

OTHER PUBLICATIONS

'What dictionary changes force recompiling: Time Stamp and CRC?' by Knowledgebase, Dec. 21, 2015.*
'CDC or Delta processing—at the staging database' by Toolbox, Sep. 2009.*
'Overview of 1-Wire Technology and Its Use' by Bernhard Linke, Jun. 19, 2008. (Year: 2008).*
'1-Wire protocol simple and easy' by ScienceProg, Feb. 28, 2007. (Year: 2007).*

* cited by examiner

BATTERY COMMUNICATION SYSTEM FOR BATTERY PACKS

TECHNICAL FIELD

This disclosure relates to a battery communication system for a battery pack. The battery communication system is configured to request and transmit battery data along a path that is shared with a heartbeat generation circuit of a battery monitoring integrated circuit (BMIC).

BACKGROUND

The desire to reduce automotive fuel consumption and emissions is well documented. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack typically powers the electric machines and other electrical loads of the electrified vehicle. The battery pack includes a plurality of battery cells arranged in one or more cell stacks or groupings. The battery cells require monitoring to maximize efficiency, maximize performance, and detect potential battery malfunctions. Some battery packs utilize battery monitoring integrated circuits (BMIC's) for performing various battery cell monitoring tasks.

SUMMARY

A battery pack according to an exemplary aspect of the present disclosure includes, among other things, a battery monitoring integrated circuit (BMIC) associated with a grouping of battery cells, a calibration microcontroller configured to store battery data associated with the grouping of battery cells, a main microcontroller, and a data transmission node establishing a shared path for communicating both a status signal from the BMIC and the battery data from the calibration microcontroller.

In a further non-limiting embodiment of the foregoing battery pack, the BMIC includes a heartbeat generation circuit configured to periodically generate the status signal.

In a further non-limiting embodiment of either of the foregoing battery packs, the heartbeat generation circuit includes a switching device.

In a further non-limiting embodiment of any of the foregoing battery packs, the calibration microcontroller includes a memory device configured to store the battery data.

In a further non-limiting embodiment of any of the foregoing battery packs, the main microcontroller includes a data transmission circuit and a data reception circuit.

In a further non-limiting embodiment of any of the foregoing battery packs, the BMIC and the calibration microcontroller are part of a permanent memory circuit board mounted on or near the grouping of battery cells.

In a further non-limiting embodiment of any of the foregoing battery packs, the permanent memory circuit board includes a data transmission circuit and a data reception circuit.

In a further non-limiting embodiment of any of the foregoing battery packs, the data transmission circuit includes a first switching transistor, a first resistor, a second resistor, and a second switching transistor, and the data reception circuit includes a switching device and a third resistor.

In a further non-limiting embodiment of any of the foregoing battery packs, the main microcontroller is located remotely from the calibration microcontroller.

In a further non-limiting embodiment of any of the foregoing battery packs, the calibration microcontroller includes a data transmission pin connected to a data transmission circuit and a receiver pin connected to a data reception circuit.

In a further non-limiting embodiment of any of the foregoing battery packs, the data transmission node is a single node connecting between the calibration microcontroller and the main microcontroller.

A method according to another exemplary aspect of the present disclosure includes, among other things, transmitting battery data within a battery communication system of a battery pack along a path that is shared with a status signal from a battery monitoring integrated circuit (BMIC).

In a further non-limiting embodiment of the foregoing method, the path is established by a single data transmission node of the battery communication system.

In a further non-limiting embodiment of either of the foregoing methods, the method includes comparing a cyclic redundancy check (CRC) signal sent by a calibration microcontroller with a CRC value saved on a main microcontroller.

In a further non-limiting embodiment of any of the foregoing methods, the method includes operating the battery communication system in normal mode if the CRC signal matches the CRC value.

In a further non-limiting embodiment of any of the foregoing methods, the method includes operating the battery communication system in data request mode if the CRC signal does not match the CRC value.

In a further non-limiting embodiment of any of the foregoing methods, during the data request mode, the main microcontroller commands the calibration microcontroller to send the battery data over the path.

In a further non-limiting embodiment of any of the foregoing methods, during the data request mode, the main microcontroller pulls a high portion of the status signal down to zero volts to request the battery data to be transmitted along the path.

In a further non-limiting embodiment of any of the foregoing methods, the method includes storing the battery data within a memory device of a calibration microcontroller.

In a further non-limiting embodiment of any of the foregoing methods, the battery data includes at least one of calibration data, health data, and pertinent constants associated with a grouping of battery cells of the battery pack.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details a system and method for monitoring battery cells of a battery pack. More particularly, this disclosure details a system and method for storing identification and calibration information related to battery cells in a modular battery pack. The identification and calibration information can be stored within the battery pack at a location away from the controlling electronics of the battery pack.

An exemplary battery communication system includes a battery monitoring integrated circuit (BMIC), a calibration microcontroller, and a main microcontroller. The main microcontroller communicates with the calibration microcontroller to request and transmit battery data associated with a grouping of battery cells. In some embodiments, the battery data is transmitted along a path that is shared with a heartbeat generation circuit of the BMIC. In other embodiments, the battery data is stored in a memory device of the calibration microcontroller and therefore kept with the battery cells rather than remotely from the cells. These and other features are discussed in greater detail in the following paragraphs of this detailed description.

Figure 1:
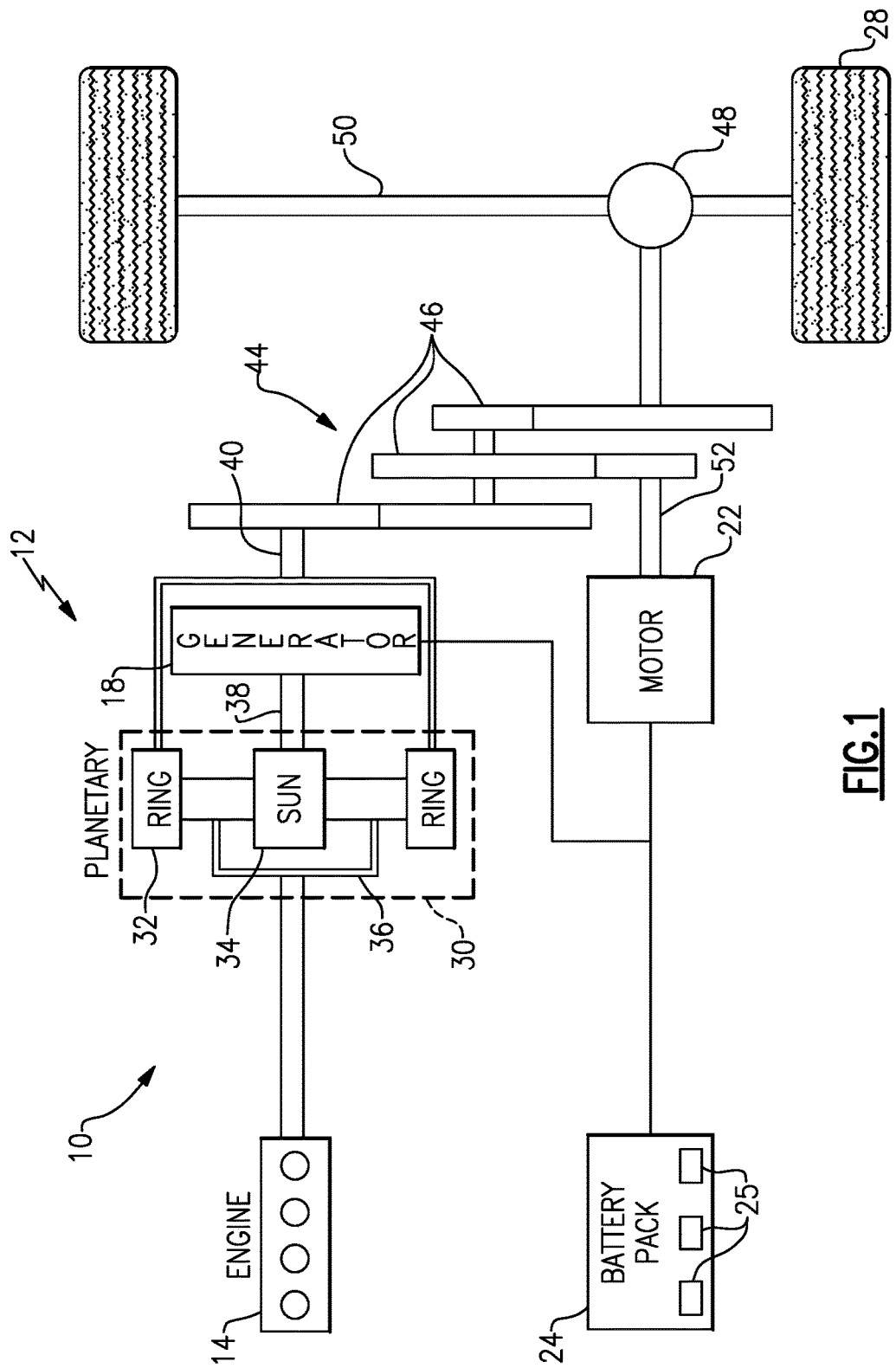
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), fuel cell vehicles, etc. Moreover, although the battery communication systems of this disclosure are described in relation to electrified vehicles, it should be understood that the various features and advantages of the exemplary battery communication systems are applicable for use within battery packs of any type of device, machine, or system. Thus, the electrified vehicle 12 of FIG. 1 is intended only as a non-limiting example of an environment which might include the battery communication systems and methods of this disclosure.

In a non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices could also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (either with or without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
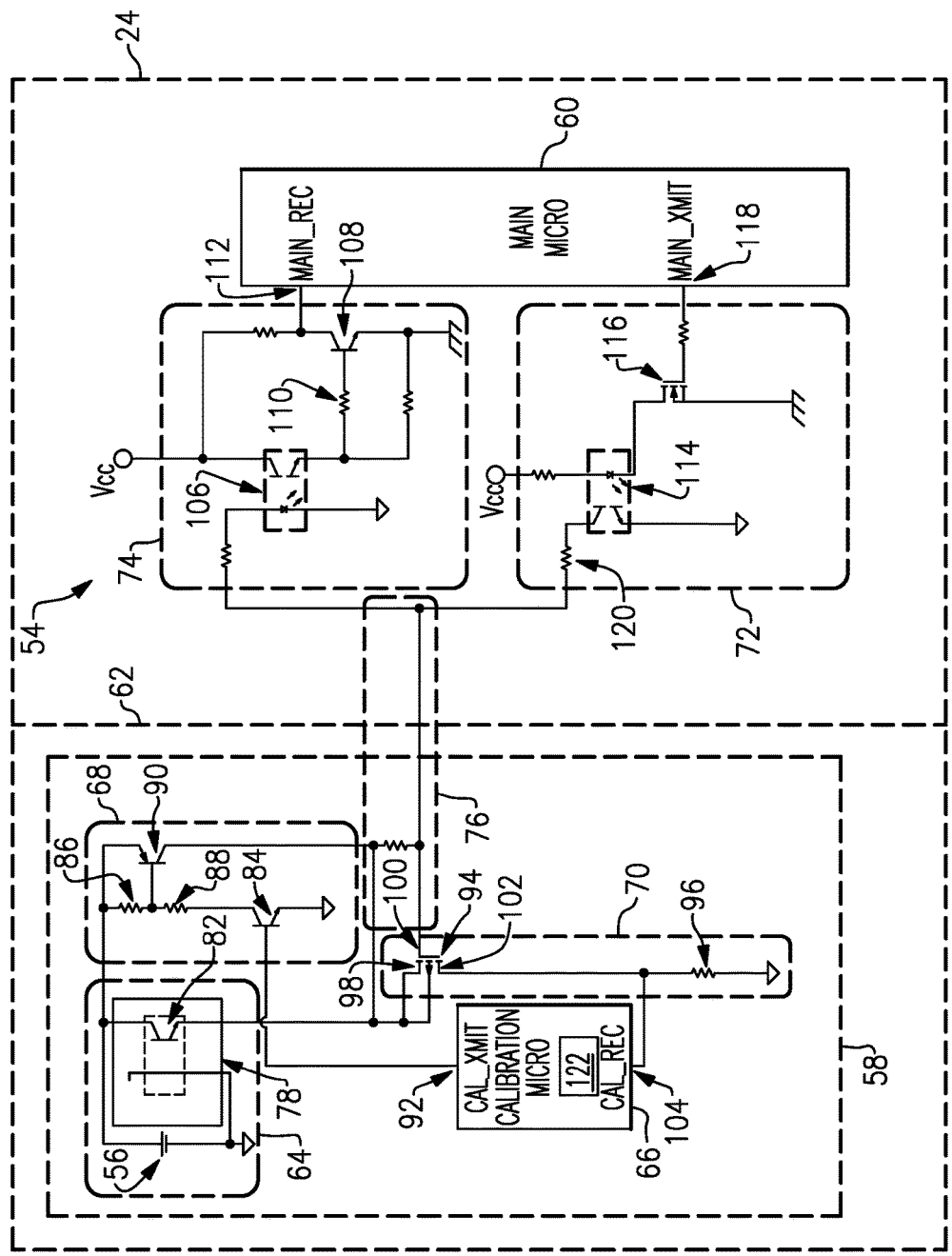
FIG. 2 is a schematic, system diagram of a portion of a battery communication system for a battery pack.

FIG. 2 schematically illustrates a battery communication system 54 for monitoring battery cells 56 of a battery pack, such as the battery pack 24 of FIG. 1 or any other battery pack. The battery cells 56 supply electrical power to various electrical loads. The battery communication system 54 may be configured to monitor any number of battery cells 56. The battery cells 56 of this disclosure may include any geometry (prismatic, cylindrical, pouch, etc.) or chemistry (lithium-ion, nickel-hydride, lead-acid, etc.).

The battery communication system 54 includes a permanent memory circuit board 58 and a main microcontroller 60. In a non-limiting embodiment, the permanent memory circuit board 58 is mounted directly to, or in close proximity to, one or more of the battery cells 56, and the main microcontroller 60 is mounted within the battery pack 24 at a location remote from the battery cells 56. An imaginary divider 62 is illustrated by a dashed line in FIG. 2. The imaginary divider 62 is included to schematically indicate that the permanent memory circuit board 58 and the main microcontroller 60 of the battery communication system 54 are remote from one another inside the battery pack 24.

In another non-limiting embodiment, the permanent memory circuit board 58 includes a battery monitoring integrated circuit (BMIC) 64, a calibration microcontroller 66, a first data transmission circuit 68, and a first data reception circuit 70. The main microcontroller 60 may include a second data transmission circuit 72 and a second data reception circuit 74. A data transmission node 76 connects between the permanent memory circuit board 58 and the main microcontroller 60. Battery data is transmitted between the calibration microcontroller 66 and the main microcontroller 60 over the data transmission node 76, in a first embodiment. In another embodiment, status signals from the BMIC 64 are also communicated over the data transmission node 76.

The BMIC 64 performs multiple functions. Non-limiting examples of the various functions of the BMIC 64 include measuring voltages of the battery cells 56, balancing each cell of the grouping of battery cells 56, and performing battery cell diagnostics. Battery data analyzed and collected by the BMIC 64 is selectively communicated to the main microcontroller 60 for further processing, as discussed in greater detail below.

A non-limiting example of a suitable BMIC is the Freescale MC3371. However, other integrated circuits may also be utilized within the scope of this disclosure. Moreover, although a single BMIC 64 is illustrated in FIG. 2, the battery communication system 54 could incorporate additional BMIC's. For example, the battery pack 24 could include multiple groupings of battery cells 56, and one BMIC 64 may be dedicated to each separate grouping of battery cells 56. In another non-limiting embodiment, one BMIC 64 may be associated with each individual battery cell 56 of the battery pack 24. This disclosure is thus not limited to any specific number of battery cells or BMIC's.

In another non-limiting embodiment, the BMIC 64 includes a heartbeat generation circuit 78. The heartbeat generation circuit 78 includes a switching device 82, such as a transistor. The BMIC 64 is configured to periodically generate a status signal, sometimes referred to as a "heartbeat" signal, indicating that the BMIC 64 is operating correctly. The status signal (non-faulted) is typically high for a short duration (e.g., approximately 500 μs) and low for a longer duration (e.g., approximately 10 to 100 ms). The high portion of the status signal will be at the voltage potential or magnitude of the grouping of battery cells 56 that power the BMIC 64, and the low portion will be equipotential with the bottom of the battery pack 24. In a non-limiting embodiment, the high portion of the status signal pulls the data transmission node 76 close to the potential of the voltage of the grouping of battery cells 56. The low portion of the status signal occurs as the heartbeat generation circuit 78 releases the status signal onto the data transmission node 76. This causes the voltage on the data transmission node 76 to float down to the bottom of the battery pack 24.

The first data transmission circuit 68 of the permanent memory circuit board 58 is designed to communicate with the second data reception circuit 74 and includes a first switching transistor 84, a first resistor 86, a second resistor 88, and a second switching transistor 90. The first switching transistor 84 is controlled by a transmission pin 92 of the calibration microcontroller 66. The first switching transistor 84 turns ON as the transmission pin 92 of the calibration microcontroller 66 gets pulled above the turn-on voltage of the first switching transistor 84 with respect to the bottom of the battery pack 24 (e.g., into saturation). This pulls current through the first and second resistors 86, 88 and turns the second switching transistor 90 ON, thus pulling the data transmission node 76 close to the voltage potential of the grouping of battery cells 56. In a non-limiting embodiment, the calibration microcontroller 66 transmits battery data via the first data transmission circuit 68 only while the status signal from the heartbeat generation circuit 78 is low.

The first data reception circuit 70 of the permanent memory circuit board 58 includes a switching device 94, such as a MOSFET device or any kind of transistor or logic, and a resistor 96. The switching device 94 includes a source terminal 98 connected to the output of the heartbeat generation circuit 78 and the first data transmission circuit 68, a gate terminal 100 connected to the data transmission node 76, and a drain terminal 102 connected to a receiver pin 104 of the calibration microcontroller 66. When the data transmission node 76 is pulled low by the main microcontroller 60, the switching device 94 turns ON and the status signal voltage is received on the data transmission node 76. In a non-limiting embodiment, the first data reception circuit 70 forms an AND function between the status signal from the heartbeat generation circuit 78 and the output of the second data transmission circuit 72 of the main microcontroller 60. However, other circuit configurations can also be used to implement this functionality.

The second data reception circuit 74 of the main microcontroller 60 includes an isolation device 106. The isolation device 106 may be a photo-MOS or other similar device. The second data reception circuit 74 is configured to sense the waveform present on the data transmission node 76 through the control side of the isolation device 106. When the output of the isolation device 106 is high, the base of a switching transistor 108 is tied to Vcc through a resistor 110, thus biasing the switching transistor 108 forward-active. This pulls a receiver pin 112 of the main microcontroller 60 close to chassis ground. The effect of the second data reception circuit 74 is to output an inverted or non-inverted copy of whatever waveform is present on the data transmission node 76.

The second data transmission circuit 72 of the main microcontroller 60 is designed to communicate with the first data reception circuit 70 and includes yet another isolation device 114 and a MOSFET device 116. The function of the second data transmission circuit 72 is to pull the data transmission node 76 down enough to bias the Switching device 94 of the calibration microcontroller 66 ON. When a transmission pin 118 of the main microcontroller 60 is high, the MOSFET device 116 is biased in saturation mode and allows current to flow through the transmission side of the isolation device 114. Once the isolation device 114 is ON, the data transmission node 76 is pulled to the bottom of the battery pack 24 through a resistor 120.

In another non-limiting embodiment, the data transmission node 76 is a single node that crosses between the permanent memory circuit board 58 and the main microcontroller 60 and allows for communication between them without disrupting the status signal generated by the heartbeat generation circuit 78 of the BMIC 64. The data transmission node 76 can be pulled high by the heartbeat generation circuit 78 and the transmission pin 92 of the calibration microcontroller 66, or can be pulled low by the second data transmission circuit 72 of the main microcontroller 60. The high or low status of the data transmission node 76 can be monitored and controlled at all times by the main microcontroller 60, while the calibration microcontroller 66 only receives the status of the data transmission node 76 when the second data transmission circuit 72 of the main microcontroller 60 is active. Stated another way, the second data transmission circuit 72 of the main microcontroller 60 must transmit a window around the status signal sent by the heartbeat generation circuit 78 in order for the calibration microcontroller 66 to read the status of the data transmission node 76. In such a case, the calibration microcontroller 66 sees a double pulse when the main microcontroller 60 is asserting its status bit.

The calibration microcontroller 66 includes a memory device 122 for selectively storing battery data prior to sending the data to the main microcontroller 60 via the communication circuitry of the battery communication system 54. The memory device 122 may include any type of memory including but not limited to RAM, ROM, SRAM, FLASH, EEPROM, etc. In a non-limiting embodiment, the battery data may include calibration data, health data, pertinent constants, or any other information collected by the BMIC 64 that is related to the battery cells 56. Because the battery data is stored in the calibration microcontroller 66, which is part of the permanent memory circuit board 58 and thus mounted in proximity to the battery cells 56, this data is always located with the battery cells 56.

In a non-limiting embodiment, the main microcontroller 60 is a battery energy control module (BECM). In another non-limiting embodiment, the main microcontroller 60 is part of an overall vehicle control unit, such as a vehicle system controller (VSC). The main microcontroller 60 is programmed with executable instructions for interfacing with and operating the various components of the battery communication system 54. The main microcontroller 60 includes various inputs and outputs for interfacing with the various components of the battery communication system 54. In addition, although not shown, the main microcontroller 60 may include a processing unit and non-transitory memory for executing the various control strategies and modes of the battery communication system 54.

Figure 3:
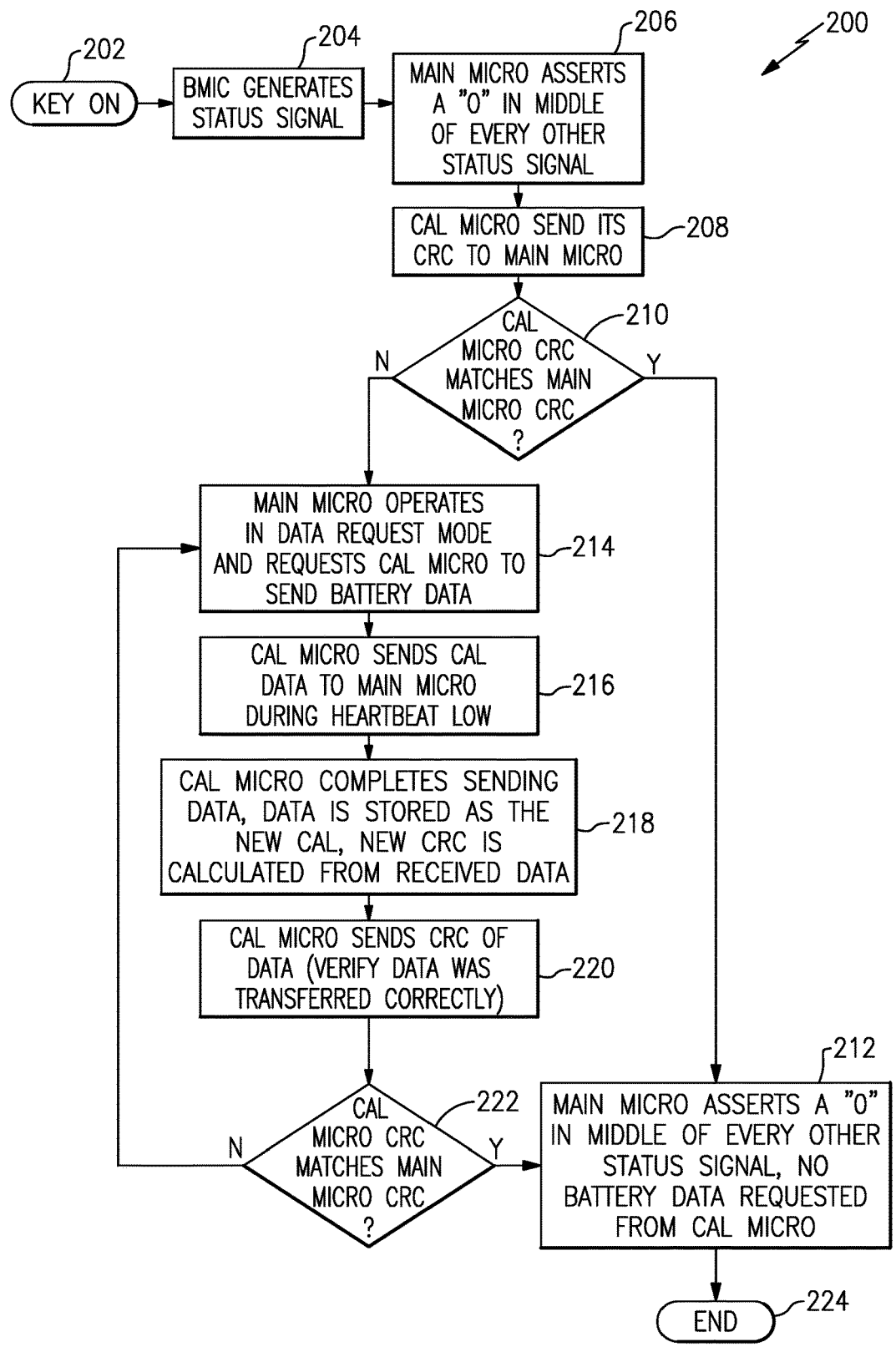
FIG. 3 schematically illustrates a process flow for an exemplary control strategy for requesting and transmitting battery data within a battery communication system of a battery pack.

FIG. 3, with continued reference to FIGS. 1 and 2, illustrates a control strategy 200 for requesting and transmitting battery data within the battery communication system 54 of the battery pack 24. The control strategy 200 allows battery data associated with the grouping of battery cells 56 to be requested and transmitted along a path (e.g., established by the data transmission node 76) that is shared with the status signals generated by the heartbeat generation circuit 78 of the BMIC 64.

The control strategy 200 begins at block 202 in response to a Key-On event of the electrified vehicle 12. At block 204, the heartbeat generation circuit 78 of the BMIC 64 initializes and then generates a status signal. The main microcontroller 60 asserts a "0" in between every other status signal at block 206. Next, at block 208, the calibration microcontroller 66 sends a cyclic redundancy check (CRC) signal to the main microcontroller 60

The CRC signal sent at block 208 is compared with a CRC value stored in the main microcontroller 60 at block 210. The CRC value may be stored in a look-up table, in a non-limiting embodiment. If the CRC signal from the calibration microcontroller 66 matches that CRC value stored in the main microcontroller 60, the control strategy 200 proceeds to block 212, at which the main microcontroller 60 asserts a "0" in the middle of every other status signal from the BMIC 64. This indicates normal operation and thus battery data is not requested from the calibration microcontroller 66.

Alternatively, if the CRC signal from the calibration microcontroller 66 does not match that CRC value stored in the main microcontroller 60 at block 210, the control strategy 200 proceeds to block 214. During block 214, the main microcontroller 60 behaves in a data request mode and asserts a status bit in the middle of every status signal, thus signaling the calibration microcontroller 66 to send battery data during the time the status signal is low. This occurs at block 216.

In a non-limiting embodiment, the battery data request and transmission must be hidden in the status signal pulse without disrupting its original function in diagnosing the state of the BMIC 64. To that end, the main microcontroller 60 uses a status bit during the high portion of the status signal pulse to control the behavior of the calibration microcontroller 66. In other words, the main microcontroller 60 pulls the high pulse of the status signal down to zero volts with respect to the bottom of the battery pack 24 for a short time. The effect of this is that the calibration microcontroller 66 sees a double pulse when the main microcontroller 60 is asserting its status bit.

The calibration microcontroller 66 finishes sending battery data at block 218. The battery data is stored in the memory device 122 of the calibration microcontroller 66 and a new CRC signal is calculated from this battery data.

Next, at block 220, the calibration microcontroller 66 sends the revised CRC signal to the main microcontroller 60. The revised CRC signal is compared with the CRC value stored in the main microcontroller 60 at block 222. If the CRC signal from the calibration microcontroller 66 matches that CRC value stored in the main microcontroller 60, the control strategy 200 proceeds to block 212 and normal operation is confirmed. However, if the revised CRC signal and the CRC value do not match, the control strategy 200 returns to block 214. The control strategy 200 ends at block 224.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
   a battery monitoring integrated circuit (BMIC) associated with a grouping of battery cells;
   a calibration microcontroller configured to store battery data associated with said grouping of battery cells;
   a main microcontroller; and
   a data transmission node establishing a shared path for communicating both a status signal from said BMIC and said battery data from said calibration microcontroller,
   wherein said status signal is a heartbeat signal that indicates an operating state of the BMIC,
   wherein said calibration microcontroller is configured to transmit said battery data only while the heartbeat signal is low.

2. The battery pack as recited in claim 1, wherein said BMIC includes a heartbeat generation circuit configured to periodically generate said status signal.

3. The battery pack as recited in claim 2, wherein said heartbeat generation circuit includes a switching device.

4. The battery pack as recited in claim 1, wherein said calibration microcontroller includes a memory device configured to store said battery data.

5. The battery pack as recited in claim 1, wherein said main microcontroller includes a data transmission circuit and a data reception circuit.

6. The battery pack as recited in claim 1, wherein said BMIC and said calibration microcontroller are part of a permanent memory circuit board mounted on or near said grouping of battery cells.

7. The battery pack as recited in claim 6, wherein said permanent memory circuit board includes a data transmission circuit and a data reception circuit.

8. The battery pack as recited in claim 7, wherein said data transmission circuit includes a first switching transistor, a first resistor, a second resistor, and a second switching transistor, and said data reception circuit includes a switching device and a third resistor.

9. The battery pack as recited in claim 1, wherein said main microcontroller is located remotely from said calibration microcontroller.

10. The battery pack as recited in claim 1, wherein said calibration microcontroller includes a data transmission pin connected to a data transmission circuit and a receiver pin connected to a data reception circuit.

11. The battery pack as recited in claim 1, wherein said data transmission node is a single node connecting between said calibration microcontroller and said main microcontroller.

12. A method, comprising:
    transmitting battery data from a calibration microcontroller of a battery communication system of a battery pack along a path that is shared with a status signal from a battery monitoring integrated circuit (BMIC),
    wherein the status signal is a heartbeat signal that indicates an operating state of the BMIC, and
    wherein the battery data is transmitted over the path only while the heartbeat signal is low.

13. The method as recited in claim 12, wherein the path is established by a single data transmission node of the battery communication system.

14. The method as recited in claim 12, comprising:
    comparing a cyclic redundancy check (CRC) signal sent by the calibration microcontroller with a CRC value saved on a main microcontroller.

15. The method as recited in claim 14, comprising:
    operating the battery communication system in normal mode if the CRC signal matches the CRC value.

16. The method as recited in claim 14, comprising:
    operating the battery communication system in data request mode if the CRC signal does not match the CRC value.

17. The method as recited in claim 16, wherein, during the data request mode, the main microcontroller commands the calibration microcontroller to send the battery data over the path.

18. The method as recited in claim 16, wherein, during the data request mode, the main microcontroller pulls a high portion of the status signal down to zero volts to request the battery data to be transmitted along the path.

19. The method as recited in claim 12, comprising:
    storing the battery data within a memory device of the calibration microcontroller.

20. The method as recited in claim 12, wherein the battery data includes at least one of calibration data, health data, and pertinent constants associated with a grouping of battery cells of the battery pack.

21. The battery pack as recited in claim 1, wherein the battery pack is an electrified vehicle battery pack.

22. The battery pack as recited in claim 1, wherein said calibration microcontroller is a separate device from said BMIC.

23. The method as recited in claim 12, wherein the battery pack is an electrified vehicle battery pack.

24. The method as recited in claim 12, wherein the calibration microcontroller is a separate device from the BMIC.

25. The method as recited in claim 24, wherein the BMIC and the calibration microcontroller are part of a permanent memory circuit board mounted on or near a grouping of battery cells of the battery pack.

* * * * *